(12) United States Patent
Daigle et al.

(10) Patent No.: US 8,972,284 B2
(45) Date of Patent: Mar. 3, 2015

(54) SYSTEM AND METHOD FOR CONTROLLING OUTDOOR SIGNS

(76) Inventors: Gene Daigle, Woodland Park, CO (US); Mike Rose, Divide, CO (US); Charles Lee Lindsey, Monument, CO (US); Vance Brown, Colorado Springs, CO (US); Douglas Stoyer, Colorado Springs, CO (US); Robert Charles Stadjuhar, Colorado Springs, CO (US)

(*) Notice: Subject to any disclaimer, the term of this patent is extended or adjusted under 35 U.S.C. 154(b) by 0 days.

(21) Appl. No.: 12/899,755

(22) Filed: Oct. 7, 2010
(Under 37 CFR 1.47)

(65) Prior Publication Data
US 2011/0246313 A1 Oct. 6, 2011

Related U.S. Application Data

(63) Continuation-in-part of application No. 11/250,273, filed on Oct. 14, 2005.

(51) Int. Cl.
*G06Q 20/00* (2012.01)

(52) U.S. Cl.
USPC ............................. 705/20; 345/2.1; 235/437

(58) Field of Classification Search
USPC .......... 345/1.1–3.1; 705/16–25; 235/435–437
See application file for complete search history.

(56) References Cited

U.S. PATENT DOCUMENTS

| | | | | | |
|---|---|---|---|---|---|
| 5,257,020 | A | * | 10/1993 | Morse | 340/908.1 |
| 5,918,212 | A | * | 6/1999 | Goodwin, III | 705/20 |
| 6,772,209 | B1 | * | 8/2004 | Chernock et al. | 709/225 |
| 7,120,596 | B2 | * | 10/2006 | Hoffman et al. | 705/28 |
| 2004/0172372 | A1 | * | 9/2004 | Wells et al. | 705/400 |
| 2005/0160014 | A1 | * | 7/2005 | Moss et al. | 705/26 |
| 2007/0074433 | A1 | * | 4/2007 | Lindsay et al. | 40/574 |
| 2007/0241988 | A1 | * | 10/2007 | Zerphy et al. | 345/1.1 |

* cited by examiner

*Primary Examiner* — Liliana Cerullo

(57) ABSTRACT

A system for controlling outdoor price signs for fuel products includes a control center. The control center determines a price for a fuel product for a number of fuel stores. The control center receives a variety of data that may have an impact on fuel prices, including competitive data from a neighborhood store. The control center has a number pricing formulas and applies a selected formula to set a fuel price at one of the fuel stores. The price is sent to a store controller. The store controller passes the fuel price information to a point of sale device that updates a pump price and an outdoor controllable sign. The sign includes feedback that it not only received the correct price but that it correctly displays the price and the price is legible.

35 Claims, 12 Drawing Sheets

Administrator —130
    Stores —132
        —
        —
        —
    Users —134
        Privilages —136
            -Set Price —138
            -Set Pricing Formula
            -Fuel Tank Level

FIG.7

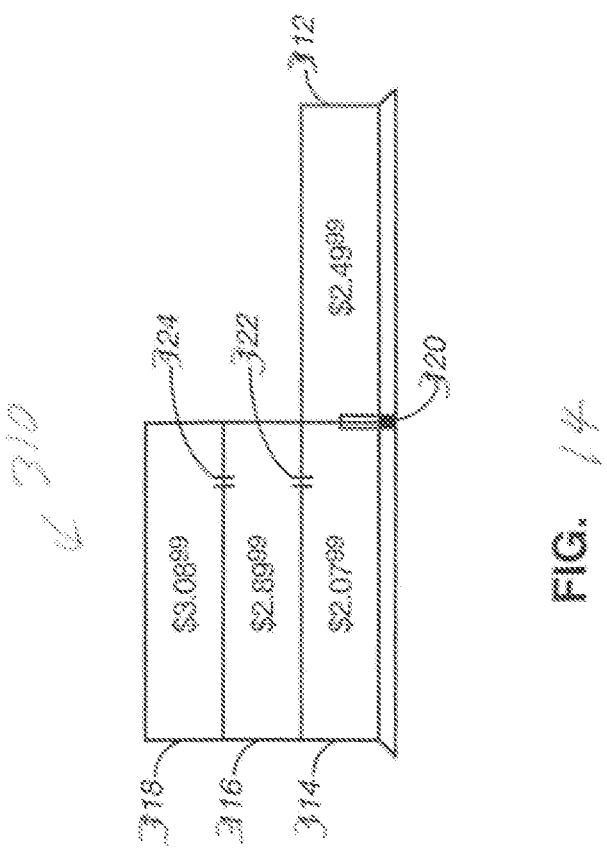

SYSTEM AND METHOD FOR CONTROLLING OUTDOOR SIGNS

RELATED APPLICATIONS

The present application is a continuation-in-part and claims priority in U.S. patent application Ser. No. 11/250,273, filed Oct. 14, 2005 assigned to the same assignee as the present application.

FIELD OF THE INVENTION

The present invention relates generally to the field of outdoor signs and more particularly to a system and method for controlling outdoor signs.

BACKGROUND OF THE INVENTION

Retail gas stations have large outdoor signs that display the price they are charging for various grades of gasoline. These signs have to be changed often because of the volatility of gas prices. When the weather is bad it is often difficult for employees to get outside and change the signs.

Most retail gas outlets make only a few cents per gallon of gasoline, however if the price of a store's gasoline is out of line with local competitors prices, they will not have as many customers enter the store and buy the high margin items. As a result, retail gas stores need to know what their competitors are charging for gasoline as well as other price factors, such as the weather, spot price of crude, etc. to properly set their price. While all this data is important it may overwhelm the retail gas station owner. As a result, it is also important to have a system for digesting the price factor data and providing a price or range of prices. There are some systems that provide price data and other systems that provide systems to analyze the data and set the price. There are also controllable price signs. However, there are no systems that combine all these needed features together.

Thus there exists a need for a system that collects price data, analyzes the price data to determine an optimal price, implement a price change at the store and updates a price sign.

SUMMARY OF INVENTION

A system that overcomes these and other problems has an outdoor sign having a price that is controllable. A controller sends a price signal that controls the price on the outdoor sign. A feedback system determines if the outdoor sign is functioning properly. A server stores competitive prices in electronic form and is in communication with the controller. The server may have a price rule algorithm based on the competitive prices. The server may transmit an alert message to a portable wireless device. The controller may communicate with a point of sale system to change the price. The point of sale system may communicate with a sign interface system. The server may receive the competitive prices from a number of price sources.

In one embodiment, a method of operating a system for controlling outdoor signs includes the steps of determining a price based on a price algorithm. An alert signal including the price is transmitted. A displayed price on a controllable outdoor sign is remotely changed. A displayed price may be checked electronically. The price changes can be verified. When the displayed price contains an error, an error message is transmitted. Competing prices may be gathered as part of the process of determining a price as well as other price factors. The alert signal may be transmitted to a cellular telephone. The suggested price may be input into a point of sale system.

In one embodiment, a system for controlling outdoor signs includes a server coupled to a number of price factor data sources. A controller is in communication with the server. A controllable sign receives a display price signal from the controller and has a feedback system that determines if the display price is operative. The server may have a price algorithm. The server may be coupled to an alerting system. The alerting system may include a cellular telephone network. The controller may communicate with a point of sale system. A sign interface system may be coupled to the point of sale system.

BRIEF DESCRIPTION OF THE DRAWINGS

FIG. 7 shows a headquarters control center operating hierarchy in accordance with one embodiment of the invention;

FIG. 14 is a front view of a modular electronic display unit 110 in accordance with one embodiment of the invention.

DETAILED DESCRIPTION OF THE DRAWINGS

The present invention is directed to solving the need for an outdoor sign system that collects competitive data, analyzes the data to determine an optimal price, deploying a price change to individual stores automatically and in plurality, and updating a price sign at a retail outlet. The system collects data from both commercially available sources and from the store employees. The server that collects the data has a number of pricing algorithms. The store owner can select a specific algorithm or create his own pricing algorithm. The server then notifies the store or the owner when a price change should be implemented based on the specific pricing algorithm including a price optimization algorithm. The price may then be changed by using a controller to change the display price on the outdoor sign. In one embodiment, the controller is tied to the server and automatically changes the display price. This system allows the gasoline retail store owner to maximize his sales and increase his store traffic for higher margin items. This system provides centralized control for the multi-store company saving time and money.

Figure 1:
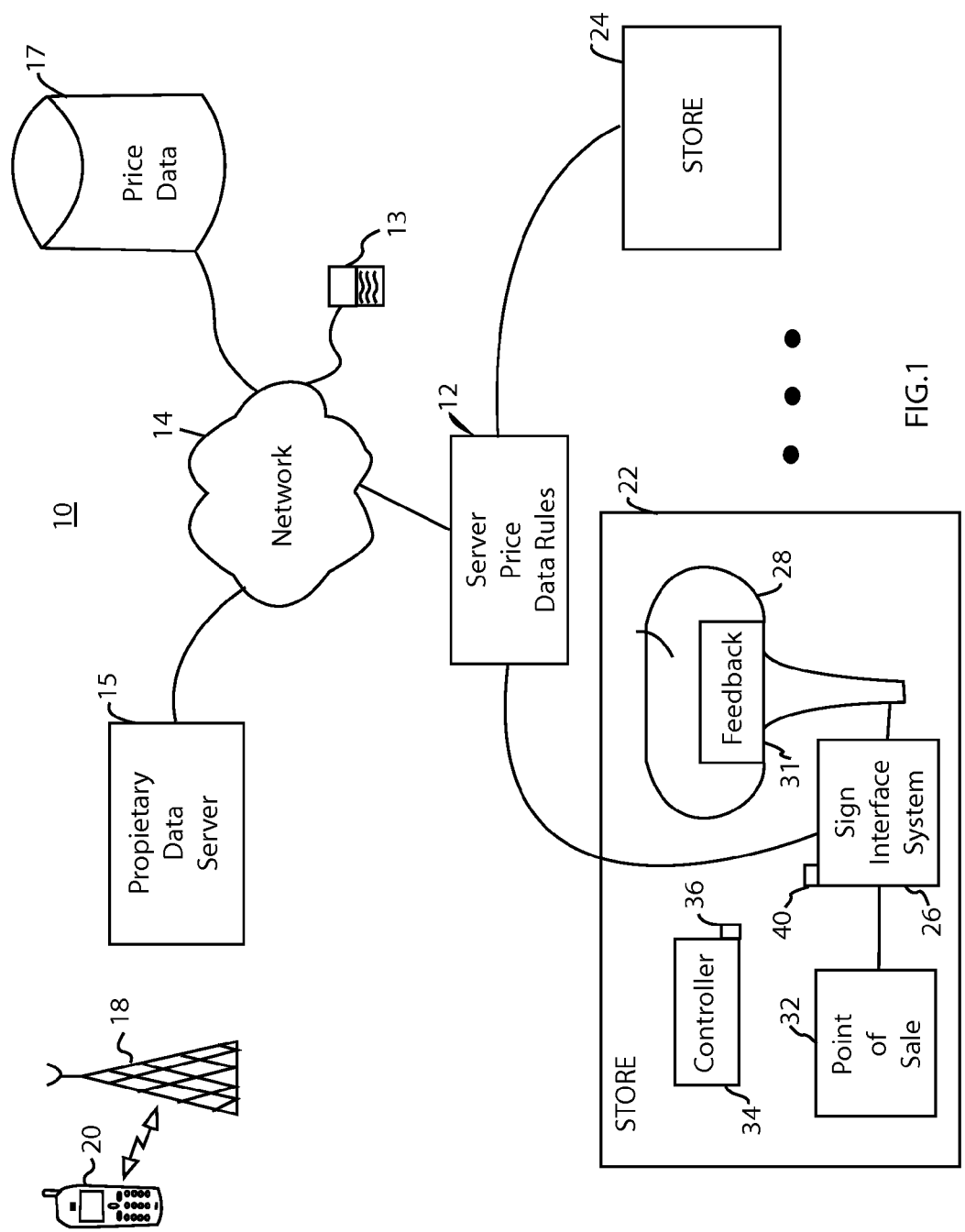
FIG. 1 is a block diagram of a system for controlling outdoor signs in accordance with one embodiment of the invention.

FIG. 1 is a block diagram of a system 10 for controlling outdoor signs in accordance with one embodiment of the invention. The system 10 has a store server 12 that stores competitive price data and has price rules and algorithms including a price optimization routine. The store server 12 may be connected to one or more clients 13, either directly or over a network 14. The store server 12 is connected through a network 14 to a proprietary data server 15. The proprietary server 15 is connected to one or more commercial price data services 17 through the network 14. The network 14 may be the internet but may be any other communication network. The proprietary server 15 is coupled to a wireless or conventional network 18 which couples the server 15 to a cellular telephone 20 or other wireless communication device.

The store server 12 is coupled to a plurality of stores 22, 24. Note that the store server 12 may not be located in a store. In one embodiment, the server 12 may connect to the stores 22, 24 through the network 14. Each store has a sign interface system 26 coupled to a controllable sign 28. Note that the controllable sign 28 has a controllable display price 30 that is an electronic display. The controllable sign 28 has a feedback system 31. The sign interface system 26 is coupled to a point of sale system 32. A handheld controller 34 has an interface 36 that allows it to coupled to an interface 40 on the sign interface system 26. The interface 36 may be a physical connection or it may be wireless connection. In addition, the handheld controller may be replaced with a touch-screen display that is coupled to the sign interface system 26. In one embodiment, no handheld or touch screen may be necessary. The store 24 is setup similarly to store 22. Note that it is possible to combine the controller 34 with the point of sale system 32 and it is possible to combine the sign interface system 26 either with the sign 28 or controller 34 or the point of sale system 32. As used herein store controller and point of sale may be used interchangeably.

The operation of the system 10 will be explained with respect to a retail gas company that has multiple retail outlets. As explained above, most of the profits of a retail gas company are made when customers buy the high margin items in the store. The gasoline is mainly used to induce customers to visit the store. If the company prices their gasoline too high then fewer customers stop to get gas and purchase the high margin items in the store. On the other hand the store cannot afford to price the gasoline so low that they are losing money on the sale of gasoline. As a result, it is important for the retail gas company to know the price competitors are charging for gasoline. One method of collecting this data is from commercial gasoline price databases shown as element 17. There are a number of such services. In addition, the service 17 may include data on other price factors such as the spot price for crude oil, gasoline inventory levels, weather issues that may affect delivery, etc. While these services 17 are helpful, the retail gas company may also need to factor in the price of retail outlets within a short distance of each of their stores. A store employee can collect local competitors' price of gasoline using the handheld controller 34 or equivalent device or cellular telephone 20 or other communication device. The information can then be uploaded to the store server 12 and from there to the proprietary data server 15. Note that there may a separate proprietary server 15 for each retail gas company or the server 15 may be segmented and protected with various encryption and password systems so that a single server 15 may serve multiple retail gas companies. The server 15 may also store fuel price, volume and margin information for stores. This information alternatively may be stored in the store server 12.

Once the retail gas company has the necessary data to determine the price of gasoline they want to charge at each of their stores, then they need to process the data and deploy the necessary price changes to the stores. The server 12 has a number of preprogrammed algorithms for setting the price of gasoline once the appropriate data has been collected. For instance, one simple price rule is our price will be one cent per gallon of gasoline less than the nearest competitor. Note for a multiple store company this means that each store 22, 24 may have a different price. Another preprogrammed algorithm is to set a price of gasoline that is in the average for the surrounding area. The server 12 also has a wizard so that more complex pricing algorithms may be setup by the retail gas company. For instance, the wizard may change the price based on the weather or time of day or may alert the retail gas company's pricing manager if the price is below the company's cost. The wizard will allow the company to set the price based on historical traffic patterns or historical traffic patterns and weather and competitor's prices. The wizard makes it easy for a non-programmer to setup these pricing rules and change them if they are not suiting the retail gas company's needs, including setting up price optimization routines. In one embodiment the price optimization routine considers competitor prices, company store price, volume (gallons sold) per grade, wholesale cost, including tax and freight, and competitor distance from company store.

Once the price of gasoline is determined the individual stores 22, 24 need to implement the price change. In one embodiment, the server 12 notifies a retail price manager of the need to change the price. This may be accomplished by sending a message over a wireless network 18 to a portable device 20. The manager may then approve the price change and the new price is sent to the store(s) 22, 24. The price may be sent to the sign interface system 26 that then notifies the store manager via the controller 34 to update the price. The store manager then approves the price and uses the controller to change price at the point of sale system 32. The point of sale system 32 then commands the sign interface system 26 to update the display price 30. The feedback system 31 next determines if the display price 30 is operative. Operative means that the display price 30 is legible and correct. If a problem exists with the display price 30, then this is communicated through the sign interface 26 to the server 12 and an alert message is sent over the wireless network 18 to the wireless phone 20. The alert message is also sent to the controller 34 or point of sale system 32. Having a controllable sign 28 instead of a manual sign is critical to making fast and effective decisions on the price of the gasoline. If the sign is manual the employees may not implement the change on time, they may make a mistake in the display price or the wind or other weather may cause the display price to be incorrect.

The sign interface system 26 allows the different types of point of sale systems 32 to communicate with different controllable signs 28. The feedback system 31 may be located in the sign interface 26. The sign interface system 26 may includes a dial-up or other modem to communicate with the server over the web (Internet) or through the PSTN (Public Switched Telephone Network) or it may communicate with the server 12 wirelessly. In one embodiment, the handheld controller 34 communicates with the server 12 and the information is passed through the interface 36, 40 to the sign interface system 26. The point of sale system 32 is a standard piece of equipment that is used in all retail gas stores. In one embodiment, the server 12 is not connected to the wireless network 18 but the sign interface system 26 is connected to the wireless network 18. Clearly, the goals of the system 10 may be accomplished even if the connections between the components are changed.

In one embodiment, the server 12 sends the new gasoline price to the sign interface system 26 or controller 34 and the display price 30 and the price at the point of sale system 32 are automatically updated. An alert message may be sent to the retail gas company's price manager 20 that the price has been changed. The price change may be overruled by the manager and the price changed using the controller 34.

When the system 10 does not automatically change the price, the server 12 sends a notice containing the suggested price change to the retail price manager 20. The manager may then approve or deny the price change, which is implemented at the store 22, 24 using the controller 34. Clearly, the system 10 is very flexible and allows each retail gas company to tailor the system to meet their needs. The basic functions that the system allows the retail gas company are: 1) gathering pricing factors; 2) analyzing the price factors to determine a price; 3) controllably updating the price sign; 4) feedback that the display price is operative; 5) central control and 6) updating point of sale system and pumps.

Figure 2:
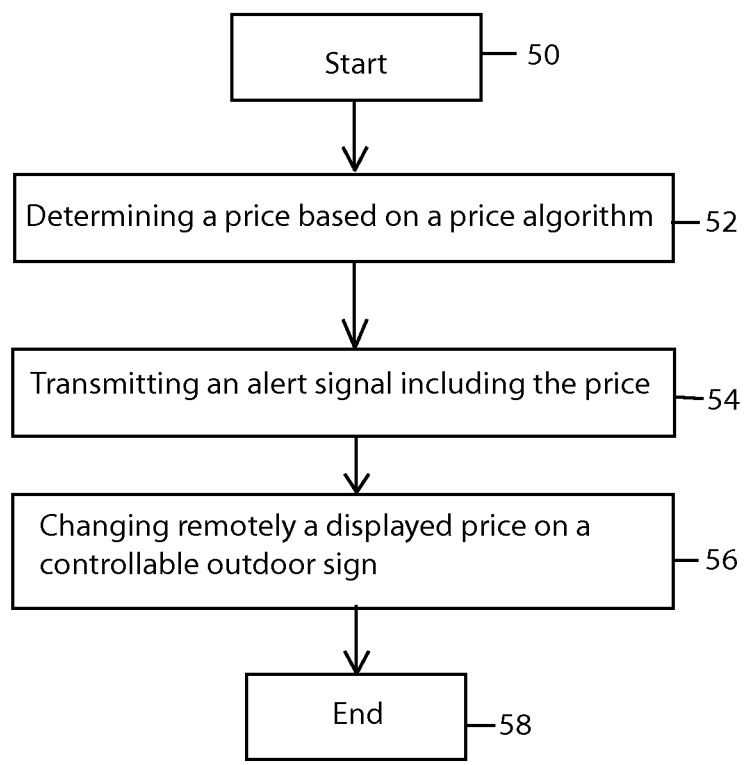
FIG. 2 is a flow chart of the steps in a method of operating a system for controlling outdoor signs in accordance with one embodiment of the invention.

FIG. 2 is a flow chart of the steps in a method of operating a system for controlling outdoor signs in accordance with one embodiment of the invention. The process starts, step 50, by determining a price based on a price algorithm or optimization at step 52. An alert signal is transmitted to a manager that includes the price at step 54. At step 56 the display price is changed remotely on the controllable outdoor sign which ends the process at step 58. The step of determining a price includes gather competitive prices and other price factors such as the spot price of oil. The price algorithm system includes a wizard that makes it easy for a user to create price rule that is tailored for the customer. The controllable sign includes a feedback system to determine if the price is legible and displaying the correct price. The feedback system is not just a determination that the price information sent to the sign is correct as in some earlier systems.

Figure 3:
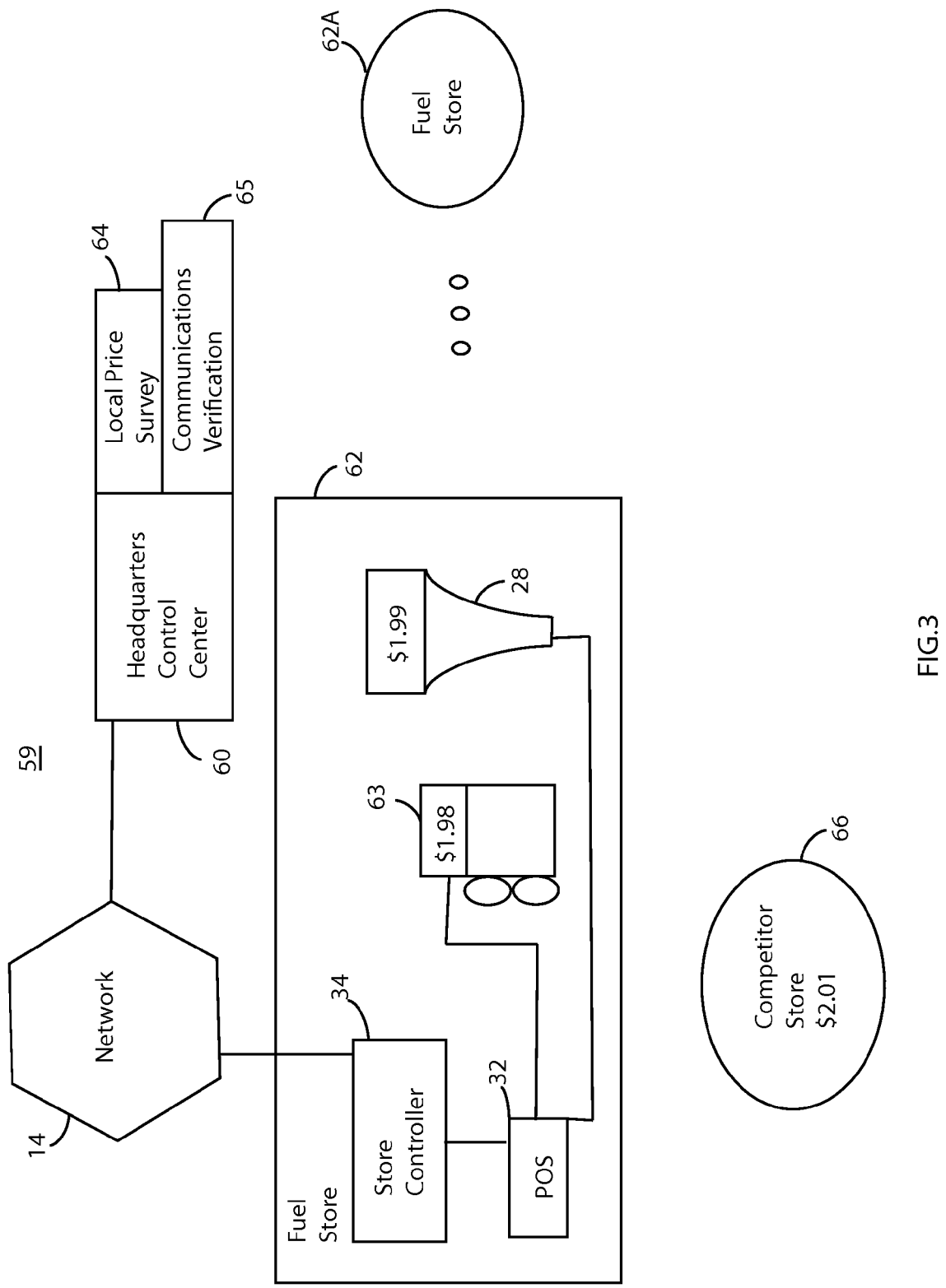
FIG. 3 is a block diagram of a system for controlling outdoor signs in accordance with one embodiment of the invention.

FIG. 3 is a block diagram of a system 59 for controlling outdoor signs in accordance with one embodiment of the invention. The system 59 includes a headquarters control center 60. The control center 60 is connected to a store controller 34 at a store 62 through a communication network 14. The store 62 is physically separated from the headquarters 60. In generally there are numerous stores 62A, each having the same basic elements. The store controller 34 has a local communication link to a point of sale device (POS) 32. The POS 32 controls the price at the fuel pump 63. The POS 32 also controls the price of a large outdoor controllable sign 28. A competitor store 66 is in the same neighborhood as the fuel store 62. The headquarters control center 60 also includes a local price survey system 64 and a communications verification system 65.

The control center 60 determines the price of fuel products for a plurality of stores 62, 62A that may be scattered throughout a city, state, or even the nation. The headquarters 60 passes fuel data over a network 14 to each of the store controllers 34. For instance, the headquarters may send a fuel price to the controller 34. This fuel price is then passed to the POS 32, which updates the price at the pumps 63 and the outdoor controllable sign 28. Other fuel data that may be communicated includes sales volume, fuel tank levels, competitor price data, etc. The headquarters control center 60 determines a fuel price for each of the stores 62, 62A based on competitor data, historical patterns, tank levels and a variety of other information.

In one embodiment, the system includes a local price survey system 64. This system 64 may send requests to one of more of the stores 62, 62A requesting an employee to report on the price for a fuel product at a competitor store 66. The competitor store 66 is in the same neighborhood as the store 62. The local competitor data may only be available by a physical survey by a store employee. The store employee then sends back the survey with the requested information.

In one embodiment, the headquarters control center 60 has a communication verification system 65 that closes the loop on any fuel price changes. The verification system 65 first verifies that any fuel price changes sent from headquarters 60 to the store controller 34 were accurately received. This can be accomplished in a number of ways. For instance, the fuel price change can be sent using an error correction code. When the store controller 34 receives the fuel price changes the information is checked using the error correction code. If the information is correct, the store controller send an acknowledgement that it received the fuel price change correctly to headquarters 60. The headquarters control center then logs that the message was correctly received and time stamps this status. A similar process is used to verify that the information was correctly sent and received from the store controller 34 to the point of sale device 32. The status of the message is also logged at the headquarters 60. This process is repeated for the POS 32 to the fuel pumps 63 and for the POS 32 to the controllable outdoor sign 28. Finally, the outdoor control sign has a feedback system that allows it to determine that the sign 28 is correctly displaying the correct price. This means that the sign verifies not only that the information was correctly received but that it is correctly displaying the correct price and that the sign is legible. In one embodiment, this may include sending an image of the sign back to the headquarters control center. Even in this case the sign 28 makes an independent evaluation that the sign is correct and legible. The communication verification system monitors every link in correctly displaying a fuel price. As a result, this makes it easy for an administrator to identify where any breakdown in the chain of communication and action occurs.

Figure 4:
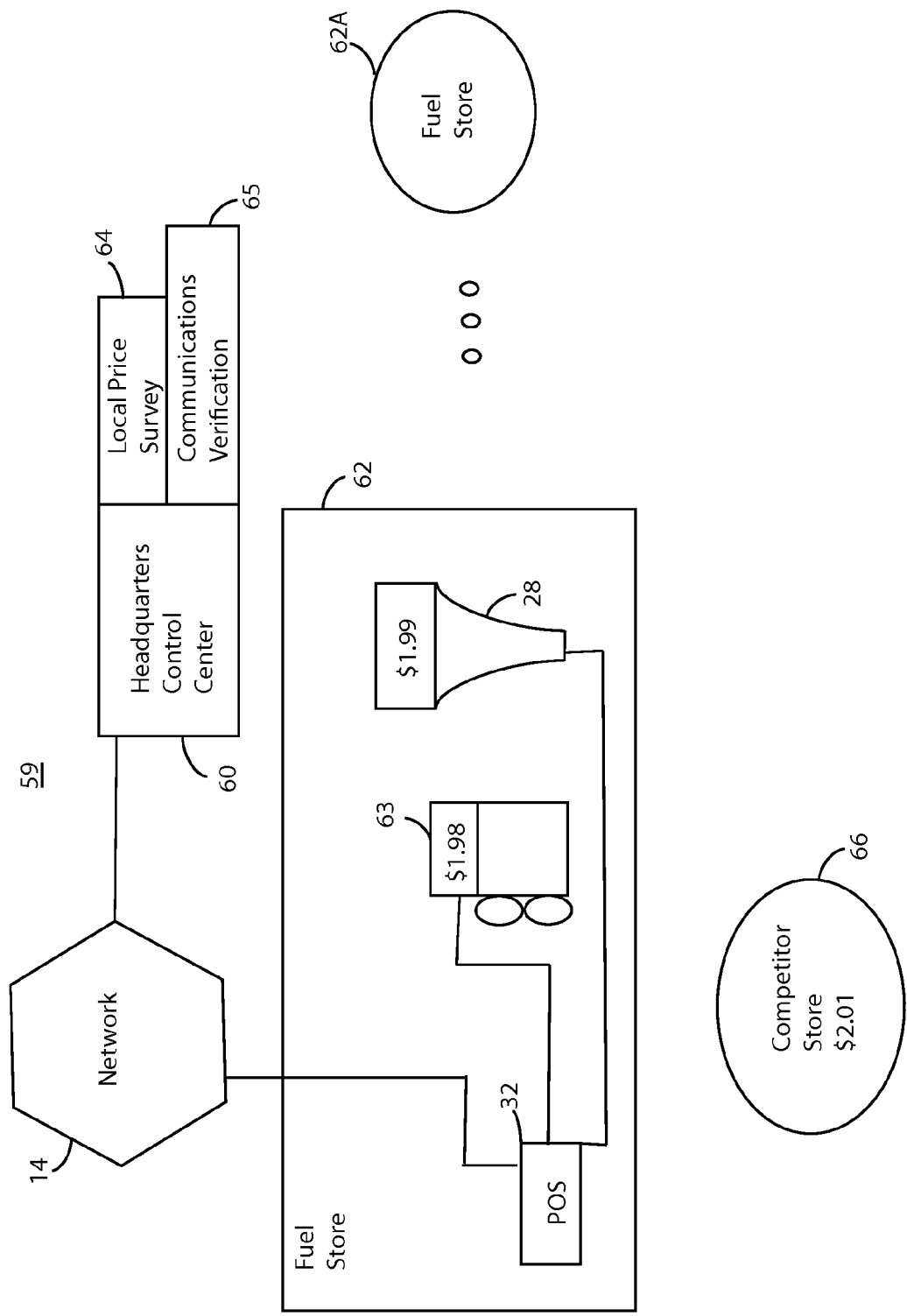
FIG. 4 is a block diagram of a system for controlling outdoor signs in accordance with one embodiment of the invention.

FIG. 4 is similar to the system 59 shown in FIG. 3 except that there is no store controller 34. All the functions performed by the store controller 34 are done by the point of sale system 32. In one embodiment, the system 59 does not have the local price survey system 64 or any pricing algorithm, optimization or other competitive pricing system. This scaled down system allows control of the fuel pricing for a fleet of stores from a central headquarters all with communication verification. The headquarters control system 60 is accessed with a personal computer. In another embodiment, the system does not include any headquarters control system 60. However, the communication verification system 65 still monitors the communications between the point of sale device 32 and the controllable signs 28, 63 and the controllable signs still have feedback systems that determine if a price is legible and correctly displayed.

Figure 5:
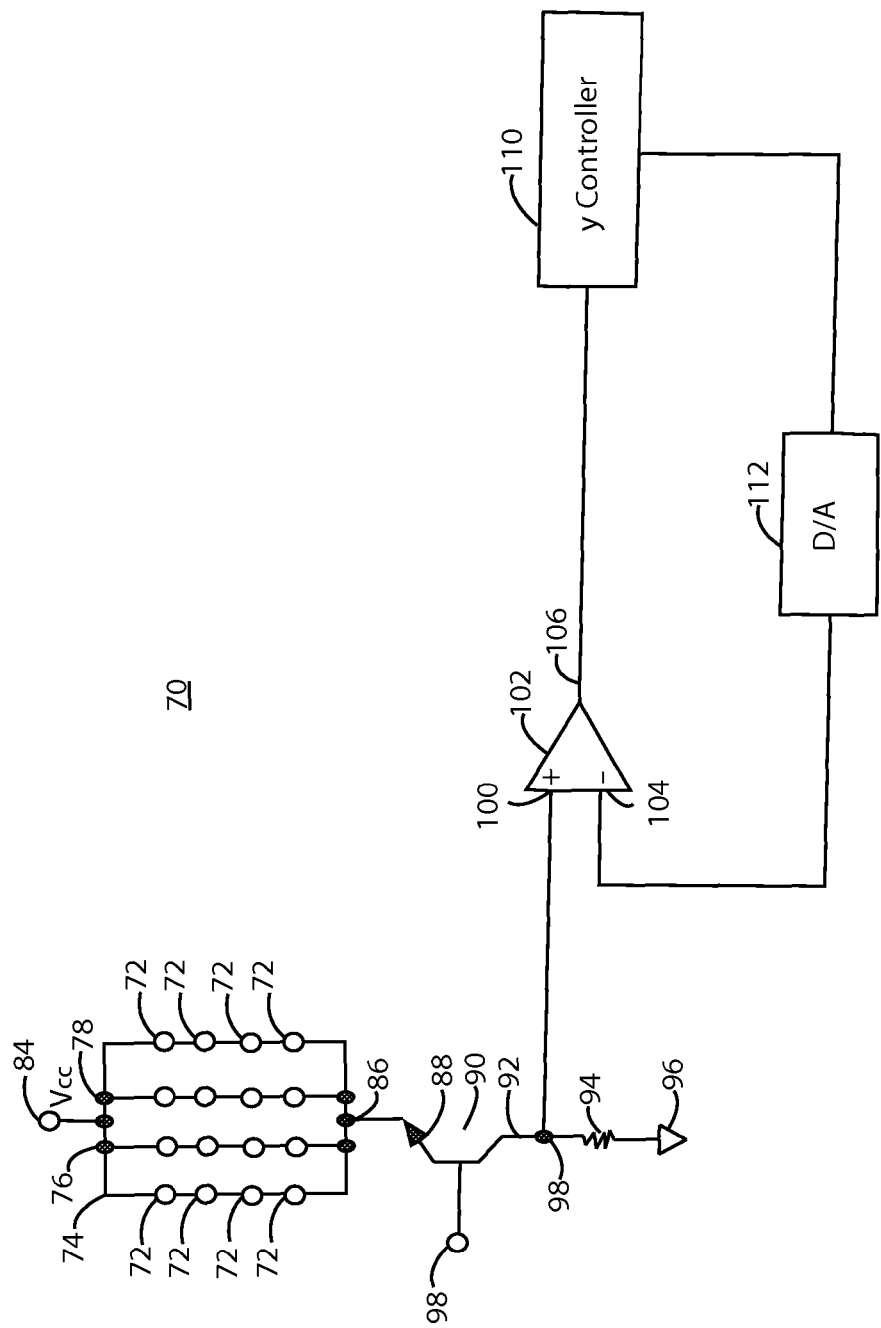
FIG. 5 is a block diagram of a feedback circuit for a display sign in accordance with one embodiment of the invention.

FIG. 5 is a block diagram of one of many types of feedback circuits 70 for a display sign in accordance with one embodiment of the invention. The feedback circuit 70 has a plurality of lights 72. The lights 72 are arranged in four strings 74, 76, 78 & 80. Within each string of lights 74, 76, 78 & 80 the lights 72 are in series. The strings of lights 74, 76, 78 & 80 are in parallel. The lights may be any type of lights, however LEDs (light emitting diodes) are the most commonly used in the industry at this time. At a first node 82 the lights 72 are coupled to a power supply voltage Vcc 84. At a second node 86 the lights 72 are coupled to a drain 88 of a transistor 90. The transistor 90 is a controllable switch in the circuit. The source 92 of transistor 90 is coupled to a resistor 94. The other node of the resistor 94 is coupled to ground 96. The base 98 of transistor 90 is coupled to a controller which may be a sign controller that turns on or off a group of lights 72. A sign would normally be made up of several groups of lights, but only one is shown for clarity. The first node 98 of the resistor 94 is coupled to an input 100 of a comparator 102. The second input 104 of the comparator is coupled to a reference voltage. The output 106 of the comparator 102 is coupled to a microcontroller 110. The microcontroller 110 has an output that is coupled to a digital to analog converter (D/A) 112. The output of the digital to analog converter 112 is coupled to the reference input 104.

In operation, when the controller closes the switch 90, by applying a high signal to the base 98 of the transistor 90, the group of lights 72 draw current. If one of the lights 72 is out then one of the strings of lights 74, 76, 78 or 80 is not drawing current. As a result, the voltage across the resistor 94 will be less than if all the lights 72 were operable. The voltage at node 98 is compared to a reference voltage 104 by the comparator 102. In one embodiment, the reference voltage 104 is set to be equal to the voltage when all the lights 72 are operating. The difference in voltage when one or more strings of lights are not operating results is an output voltage from the comparator 102. The microcontroller 110 receives the difference voltage and determines that one, two or more strings of lights are inoperable. The microcontroller 110 may then send a message to the sign controller which may forward the message to the owner or operator of the sign. The information may included an indication that a problem exists, but no action is required immediately. Alternatively, the information may be that the sign is illegible and action must be taken immediately. In one embodiment, the microcontroller 110 may be connected to a communication network. The alerting message may be sent over this communication network.

The system 70 is self calibrating in one embodiment. When the sign is initially turned on, the switch 90 is closed. Note that the switch 90 may be a p-channel transistor or any other controllable switch. When the switch 90 is closed current flows through the lights 72 to the resistor 94 and to ground 96. The current flowing through the lights 72 is proportional to the number of strings 74, 76, 78 & 80 that are operating. The voltage at node 98 is directly related to the number of strings 74, 76, 78 & 80 operating. When the sign is initialized, the voltage 98 is compared to a preset reference at input 104. If the voltage at node 98 is higher (or lower) than the preset reference voltage, then the output 106 will be a positive (negative) voltage. The difference voltage is detected by the microcontroller 110. The microcontroller 110, then directs the digital to analog converter 112 to output a higher (lower) voltage at node 104, until the reference voltage is essentially equal to the voltage at node 98. Once the circuit is calibrated the microcontroller 110 stores the reference voltage and switches into operating mode. The calibration feature allows the circuit 70 to adjust to any number of strings of lights 74, 76, 78 & 80. Note that a string of lights may be single light or multiple lights.

Figure 6:
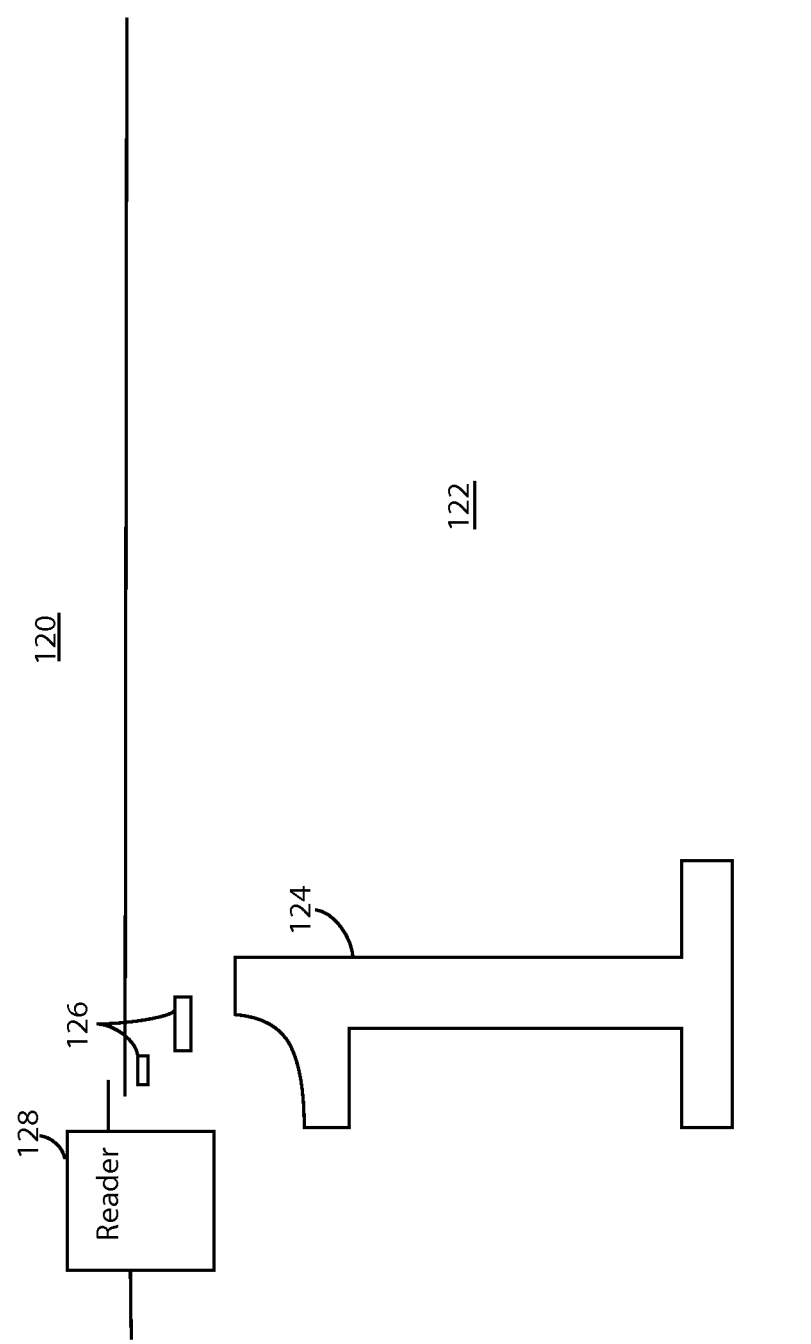
FIG. 6 is a schematic diagram of a feedback system for a scroll sign in accordance with one embodiment of the invention.

FIG. 6 is a schematic diagram of a feedback system 120 for a scroll sign in accordance with one embodiment of the invention. Some outdoor signs are scroll signs that have a web 122 with printed numbers 124. The web 122 is scrolled until the correct number 124 is correctly placed in the window of the scroll sign. In order to provide feedback that the sign is displaying the correct price, scroll signs have slots 126 in the web 122. When these slots 126 are aligned with the reader 128, the reader 128 determines which number is being displayed. In one embodiment the slots are read using contact switches. A finger in the contact switch closes when it is aligned with a slot 126. This ensures that the sign is legible and correctly displaying the correct number. Other methods of providing feedback for scroll signs include optical slots, magnets in place of the slots, etc.

FIG. 7 shows a headquarters control center operating hierarchy in accordance with one embodiment of the invention. The control center defines an administrator who has the permission 130 to setup stores 132 and users 134. Each user 134 is associated with one or more stores 132. Each user 134 has a set of privileges 136. For instance, a user 134 may have the right to set or change the price of a certain product 138. Other privileges 136 include but are not limited to setting a pricing formula 140 and viewing a fuel tank level 142.

Figure 8:
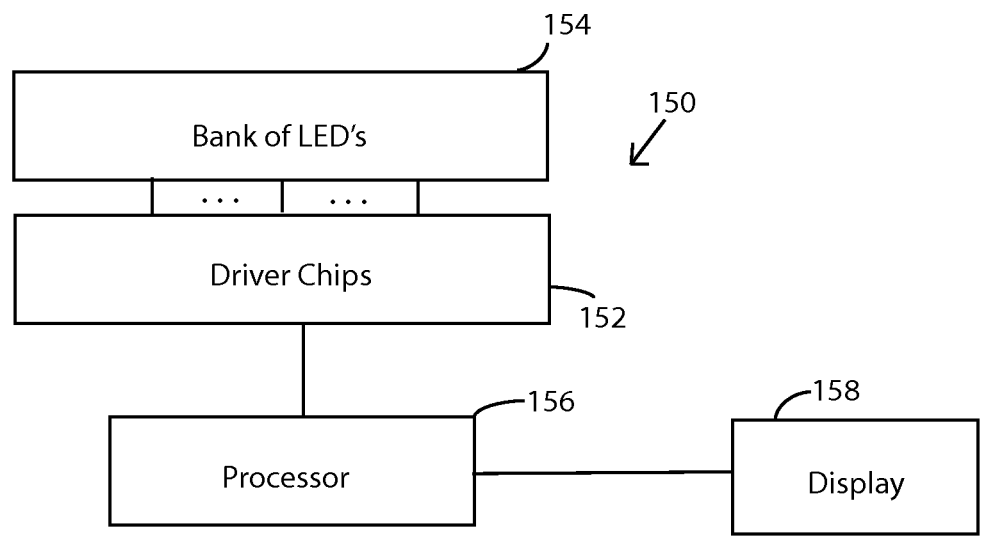
FIG. 8 is a block diagram of a feedback circuit for a display sign in accordance with one embodiment of the invention.

FIG. 8 is a block diagram of a feedback circuit 150 for a display sign in accordance with one embodiment of the invention. A plurality of driver chips 152 accurately drive the bank of LEDs (Light Emitting Diodes) that form at least a portion of a sign. The driver chips 152 deliver a precise amount of current to each LED 154 ensuring that the LED 154 has the proper brightness without wasting power. The driver chips 152 determine if an LED 154 has an error condition. An error condition is defined as an open circuit, a short circuit, or an over temperature condition. If the driver chips 152 determines the LED 154 has a short circuit or and over temperature condition it shuts down the LED 154 and does not supply it with current. These error conditions are detected they are sent to the processor 156. The processor 156 has a routine that uses this information to determine if the LED being off is affecting whether the sign is legible and correct. For instance, if a single LED is off in a group of LEDs forming a pixel this may have no effect on whether the sign is legible. Note that in the case where multiple LEDs form a pixel the processor can increase the brightness of the remaining LEDs to compensate for one or more LEDs being non-functional. On the other hand if three LEDs form the middle bar "-" in H and three are out this would make the sign illegible. In one embodiment, the processor 156 is connected to a display 158, which may be at a remote location. The display 158 may recreate how the sign looks. This may be used for human oversight or override of the processor decision that the sign is legible or illegible.

Figure 9:
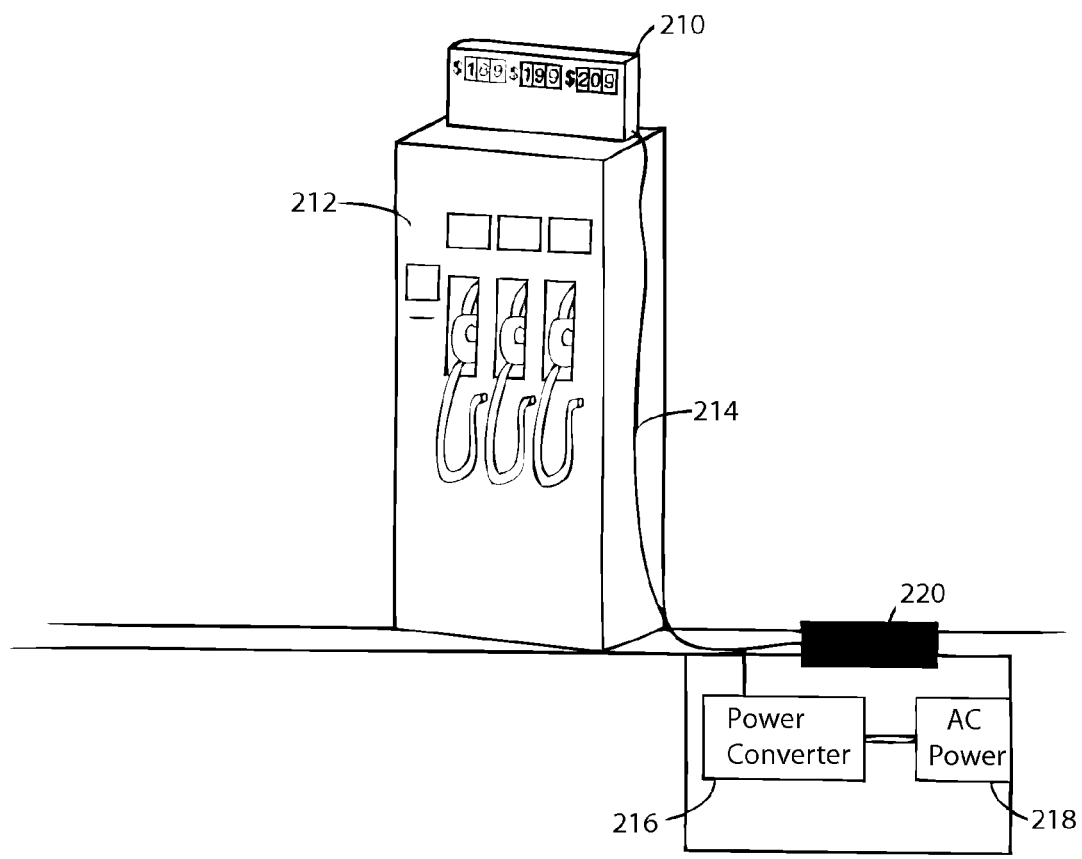
FIG. 9 is a perspective view of an electronic display unit 10 in accordance with one embodiment of the invention.

FIG. 9 is a perspective view of an electronic display unit 210 in accordance with one embodiment of the invention. The electronic display unit 210 is attached to the top of a gas station pump 212. The electronic display unit 210 has a cord 214 that provides low voltage power to the sign 210, such as 12 VDC. The cord 214 is connected to a power converter 216 that converts the incoming 120 VAC power 218 to a low voltage power. Commonly, the power box for the pump 212 is located below the ground next to the pump 212 under a cover 220, however the power box may not be below ground and may even be inside the pump.

Figure 10:
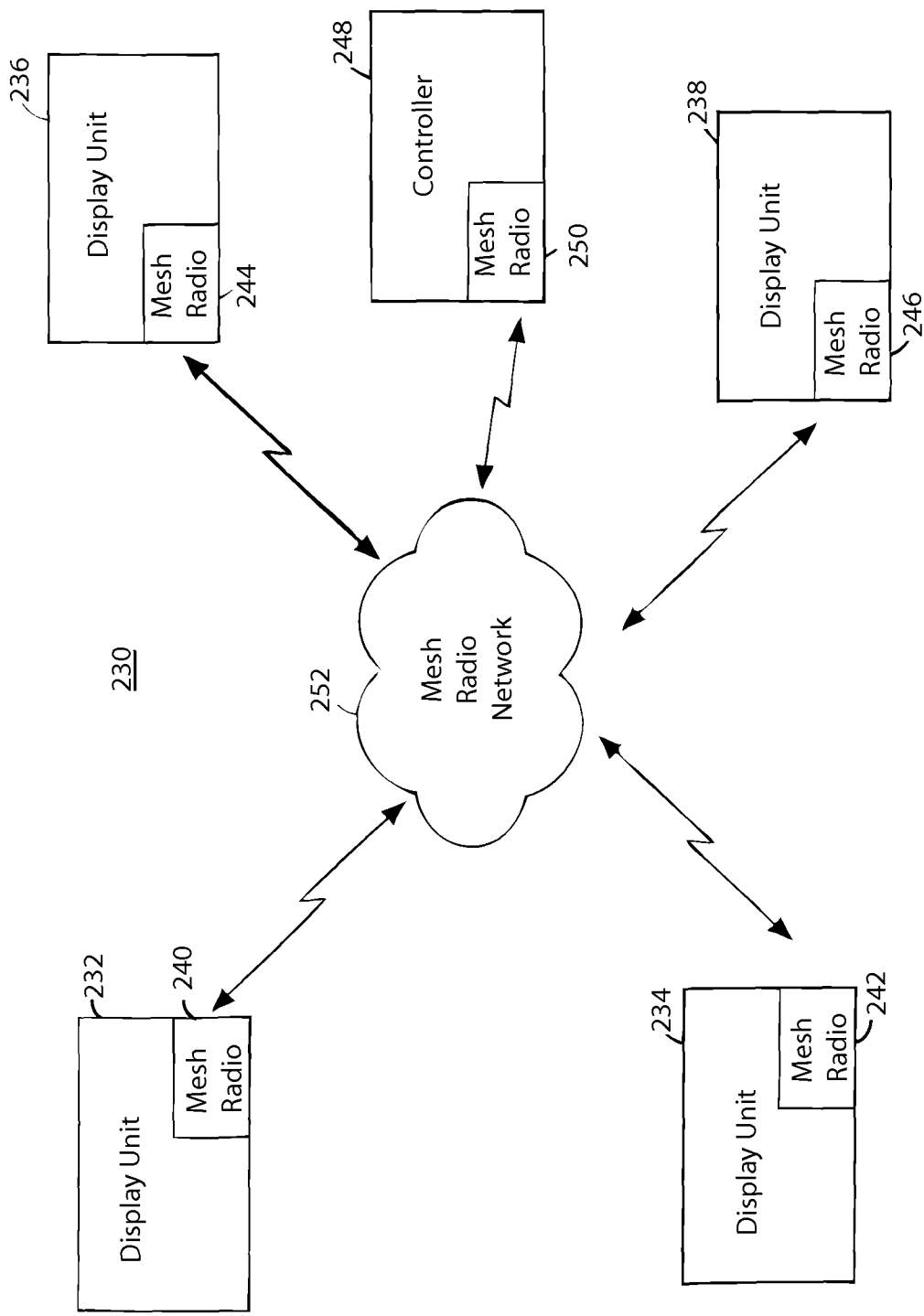
FIG. 10 is a block diagram of an electronic display system 30 in accordance with one embodiment of the invention.

FIG. 10 is a block diagram of an electronic display system 230 in accordance with one embodiment of the invention. The system 220 has a number of display units (DU) 232, 234, 236, 238. Each display unit 232, 234, 236, 238 has a mesh radio 240, 242, 244, 246. The system 230 also has a controller 248 with a mesh radio 250. The mesh radios 240, 242, 244, 246 & 250 are all connected together by the mesh radio network 252. This is somewhat misleading, since the mesh radios actually form the mesh radio network. The advantage of mesh radios, or similar systems, is that the peer-to-peer arrangement allows signals to be routed a number of different paths. So in the case of a gas station, if a big truck is blocking the path between one of the signs (e.g., DU 232) and the controller 248, the signal can be routed to DU 236 first and then on to DU 232. This makes the system 230 very robust. Note this can also be important in the case of parking garages, where an RF signal from a controller to a sign may be blocked by the construction of the garage, but can be relayed by another sign. The controller 248 can individually control the displays for each of the display units 232, 234, 236, 238. So in the case of a gas station, the price at DU 234 can be changed separate from the price at DU 238.

Figure 11:
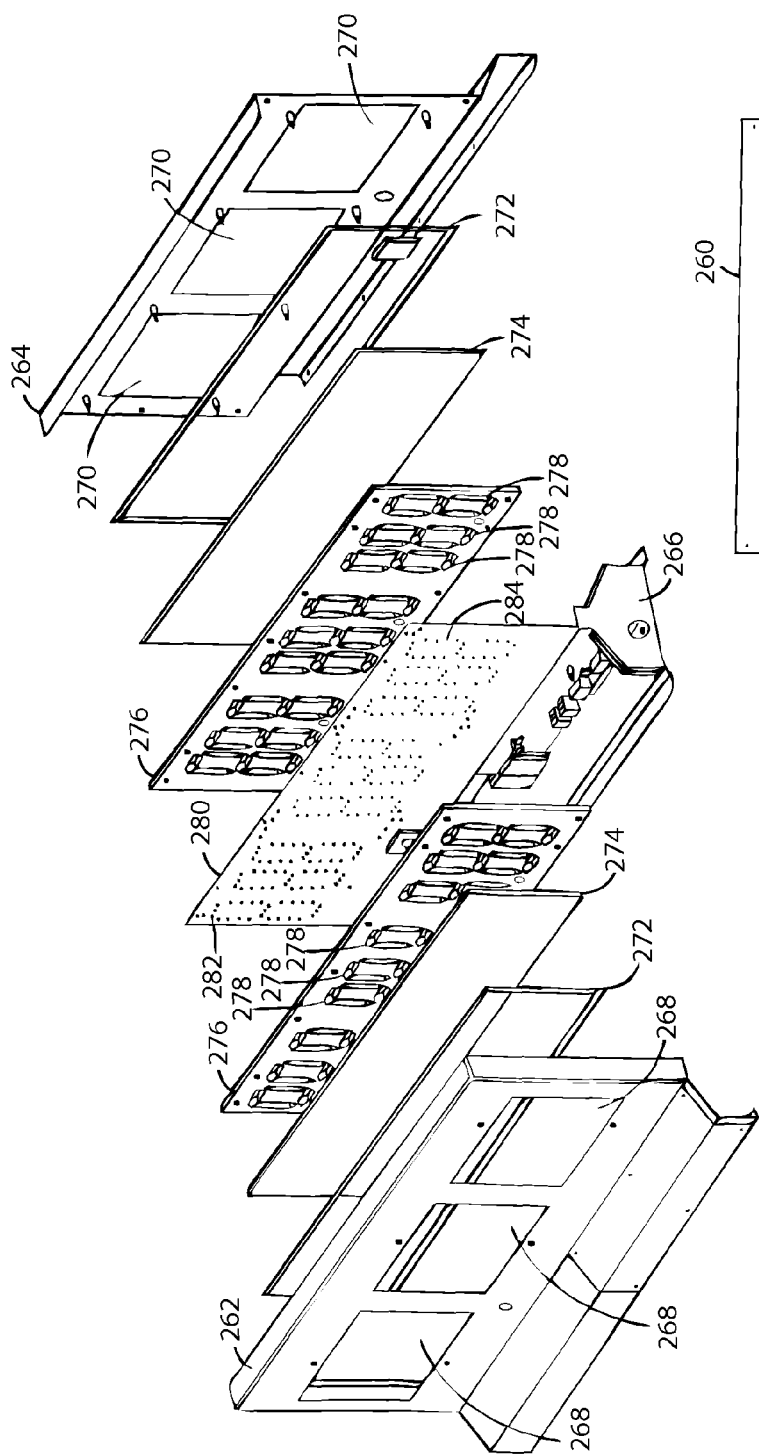
FIG. 11 is an exploded view of an electronic display unit 260 in accordance with one embodiment of the invention.

FIG. 11 is an exploded view of an electronic display unit 260 in accordance with one embodiment of the invention. The display unit 260 has a frame having a front face 262, a back face 264 and a base 266. The front face 262 has a number of display sections 268 and the back face 264 also has a number of display sections 270. Commonly the frame 262, 264, 266 is made of sheet metal or plastic. Next to the front face 262 and the back face 264 is a tape 272. The tape 272 holds a clear frosted cover 274 to the frame. The frosting tends to reduce the glare of the display. The clear frosted cover 274 may have a tinting cover applied or may having tinting incorporated into the cover 274. The tinting increases the contrast of the sign when in sunlight. Next is a pair of aperture stops 276 that have a number of seven segment cutouts 278. In one embodiment, the aperture stop 276 is formed from a micro-cellular, closed cell foam, such as polyurethane. The material for the aperture stop 276 should be easy to machine, be UV resistant and stable and thermally insulating. Polyurethane meets these requirements and can be die-cut to form the required apertures. In another embodiment, the aperture stop is injection molded. The aperture stop eliminates bleeding between different segments of the display. Sandwiched between the pair of aperture stops 276 is a printed circuit board 280. The printed circuit board 280 has surface mounted LEDs 282, 284 on both sides of the board 280. A single circuit board acts as a display for both the "front" and "back" display sections.

Figure 12:
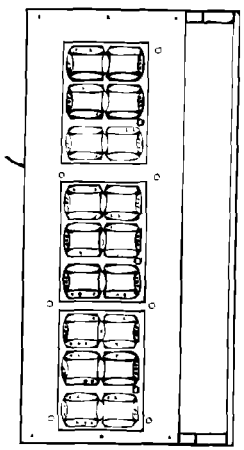
FIG. 12 is a front view of an electronic display unit 260 of an electronic display unit in accordance with one embodiment of the invention.

FIG. 12 is a front view of an electronic display unit 260 of an electronic display unit in accordance with one embodiment of the invention. This view shows how the sign 260 looks when assembled.

Figure 13:
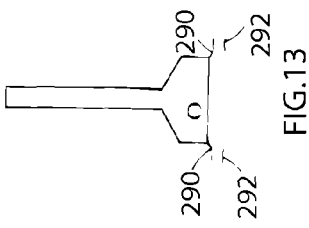
FIG. 13 is a side view of an electronic display unit 260 in accordance with one embodiment of the invention.

FIG. 13 is a side view of an electronic display unit 260 in accordance with one embodiment of the invention. This view shows flanges 290 in the frame base 66 that are used to mount the display 260 to a gasoline pump. Commonly the flanges 90 are adhered to the pump by double sided tape 292 or some other adhesive.

FIG. 14 is a front view of a modular electronic display unit 310 in accordance with one embodiment of the invention. The modular electronic display unit 310, has four separate modules 312, 314, 316, 318. The modules 312, 314, 316, 318 have electrical and mechanical interconnects 320, 322, 324. The modular design allows the displays to expand to accommodate additional information that needs to be displayed. Note that while the present invention has been described with respect to pump top displays, the display units could be variable message displays, controllable outdoor signs, or other gas price signs such as canopy signs, roadside signs, etc.

The invention is directed to solving the need for an outdoor sign system that collects competitive data, analyzes the data to determine an optimal price, deploying a price change to individual stores automatically and in plurality, and updating a price sign at a retail outlet. The system collects data from both commercially available sources and from the store employees. The server that collects the data has a number of pricing algorithms. The store owner can select a specific algorithm or create his own pricing algorithm. The server then notifies the store or the owner when a price change should be implemented based on the specific pricing algorithm including a price optimization algorithm. The price may then be changed by using a controller to change the display price on the outdoor sign. The signs, pumps and large display signs are updated using a mesh radio system in one embodiment. The mesh radio reduces the cost of installing signs and moving signs. This system allows the gasoline retail store owner to maximize his sales and increase his store traffic for higher margin items. This system provides centralized control for the multi-store company saving time and money.

Thus there has been described a system and method that collects price data, analyzes the price data to determine an optimal price and updates a price sign. This system provides centralized control for the multi-store company saving time and money.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A system for managing a plurality of stores, wherein the stores each sell fuel products, have fuel pumps and outdoor pricing signs, comprising:
   a headquarters control center;
   a plurality of store controllers at a plurality of fuel stores, the fuels stores each having a fuel pump, the plurality of fuel stores physically separate from each other and the headquarters control center;
   a communication network carrying a fuel data between the headquarters control center and the plurality of store controllers;
   a plurality of point of sale devices, one at each of the plurality of fuel stores, each the plurality of store controllers sending and receiving a first set of store fuel data to one of the point of sale devices;
   a plurality of outdoor controllable signs at least one at each of the plurality of fuel store, each of the plurality of outdoor controllable signs having a local communication link to one of the point of sale devices, wherein one of the plurality of outdoor controllable signs includes a feedback system that determines whether the outdoor controllable sign displays a correct and legible price,
   where determining that the outdoor controllable sign displays the correct and legible price includes a processor routine that determines whether an error condition in a plurality of light sources illuminating the outdoor controllable sign have an effect on the legibility of the sign, or wherein determining that the outdoor controllable sign displays the correct and legible price includes determining whether a scroll sign numeral indicators are aligned with readers that determine what number is being displayed by the outdoor controllable sign; and
   a local price survey system sending a price survey request to one of the plurality of fuel stores, the price survey request asking for a competitor price of a fuel product of a competitor store in a same neighborhood as the one of the plurality of fuel stores.

2. The system of claim 1, wherein the local price survey system receives a manual report of the competitor price of the fuel product of the competitor store.

3. The system of claim 1, further including a communications verification system monitoring a communication between the headquarters control center and one of the plurality of store controllers and determining if a message sent from the headquarters control center was correctly received, logging a status of the message.

4. The system of claim 3, wherein the communications verification system sends an alert if the message was not correctly received.

5. The system of claim 4, wherein the communication verification system monitors the status of a sign message sent from one of the point of sale devices to one of the plurality of outdoor controllable signs.

6. The system of claim 5, wherein one of the plurality of signs includes a feedback system that determines if a sign displays a correct and legible price.

7. The system of claim 1, wherein the headquarters control center defines an administrator, a user, a store associated with the user and a set of privileges associated with the user, wherein the set of privileges may include an ability to set a fuel price at the store.

8. A system for managing a plurality of stores, wherein the stores each sell fuel products, have fuel pumps and outdoor pricing signs, comprising:
a headquarters control center;
a communication network carrying a fuel price data to the headquarters control center;
a plurality of store controllers at a plurality of fuel stores, the fuels stores each having a fuel pump, the plurality of fuel stores physically separate from each other and the headquarters control center;
a plurality of outdoor controllable signs at least one at each of the plurality of fuel store, each of the plurality of outdoor controllable signs having a local communication link to one of the plurality of store controllers, wherein one of the plurality of outdoor controllable signs includes a feedback system that determines whether the outdoor controllable sign displays a correct and legible price,
where determining that the outdoor controllable sign displays the correct and legible price includes a processor routine that determines whether an error condition in a plurality of light sources illuminating the outdoor controllable sign have an effect on the legibility of the sign or wherein determining that the outdoor controllable sign displays the correct and legible price includes determining whether a scroll sign numeral indicators are aligned with readers that determine what number is being displayed by the outdoor controllable sign; and
a client application in communication with the headquarters control center, the client application sending a user identification to the headquarters control center, when the user identification is verified by the headquarters control center allowing a first set of actions by the user.

9. The system of claim 8, further including a commercial fuel price database in communication with the headquarters, the commercial fuel price database storing a plurality of data related to a retail price of a fuel product.

10. The system of claim 8, wherein the client application receives a fuel tank level of one of the plurality of fuel stores.

11. The system of claim 8, wherein the headquarters control center has a plurality of users and a set of privileges for each of the plurality of users, wherein the set of privileges includes an ability to set a pricing formula.

12. The system of claim 11, further including a local price survey system sending a price survey request to one of the plurality of stores, the price survey request asking for a competitor price of a fuel product at a competitor store in a same neighborhood as the one of the plurality of stores.

13. The system of claim 11, wherein the feedback system measures a current associated with a plurality of lights in the controllable sign.

14. The system of claim 11, wherein the feedback system measures a continuity of a plurality of contacts.

15. A system for managing a plurality of stores, wherein the stores each sell fuel products, have fuel pumps and outdoor pricing signs, comprising:
a plurality of point of sale devices, one at each of the plurality of fuel stores, each the plurality of point of sale devices sending and receiving a first set of store fuel data to one of the point of sale devices;
a plurality of outdoor controllable signs at least one at each of the plurality of fuel store, each of the plurality of outdoor controllable signs having a local communication link to one of the point of sale devices;
a headquarters control center defining a pricing formula for a fuel product at one of the plurality of fuel stores and transmitting a fuel price to the one of the plurality of fuel stores; and
a communications verification system monitoring a communication between the headquarters control center and one of the plurality of store controllers and determining if a message sent from the headquarters control center was correctly received, logging a status of the message;
wherein one of the plurality of outdoor controllable signs includes a feedback system that determines whether the outdoor controllable sign displays a correct and legible price,
where determining that the outdoor controllable sign displays the correct and legible price includes a processor routine that determines whether an error condition in a plurality of light sources illuminating the outdoor controllable sign have an effect on the legibility of the sign or wherein determining that the outdoor controllable sign displays the correct and legible price includes determining whether a scroll sign numeral indicators are aligned with readers that determine what number is being displayed by the outdoor controllable sign.

16. The system of claim 15, wherein the communications verification system sends an alert if the message was not correctly received.

17. The system of claim 16, wherein the communication verification system monitors the status of a sign message sent from one of the point of sale devices to one of the plurality of outdoor controllable signs.

18. The system of claim 17, wherein the feedback system measures a current associated with a plurality of lights in the controllable sign.

19. The system of claim 17, wherein the feedback system measures a continuity of a plurality of contacts.

20. The system of claim 17, wherein the feedback system includes a plurality of driver chips that determine an error condition for a light emitting diode.

21. The system of claim 20, wherein one of the plurality of driver chips detects an open circuit.

22. The system of claim 20, wherein one of the plurality of driver chips detects a short circuit.

23. The system of claim 20, wherein one of the plurality of driver chips detects an over temperature condition.

24. A system for managing a plurality of stores, wherein the stores each sell fuel products, have fuel pumps and outdoor pricing signs, comprising:
a pricing system for determining a price for a fuel product at one of a plurality of fuel stores;

a plurality of display units at the one of the plurality of fuel stores, each of the display units displaying the price for the fuel product; and a mesh radio network providing communication between each of the plurality of display units, wherein one of the plurality of display units includes a feedback system that determines whether the displayed price is legible and correct;

where determining that the displayed price is legible and correct includes a processor routine that determines whether error conditions in light sources illuminating the one of the plurality of display units have an effect on the legibility of the displayed price or wherein determining that the displayed price is legible and correct includes determining whether a scroll sign number indicators are aligned with readers that determine what number is being displayed by the one of the plurality of display units.

25. The system of claim 24, wherein the pricing system includes a point of sale device sending a price signal to one of the plurality of display units; and the feedback system that determines if the one of the plurality of display units is operative.

26. The system of claim 24, wherein the pricing system includes a server coupled to a plurality of price factor data sources.

27. The system of claim 26, further including a controller in communication with the server.

28. The system of claim 24, wherein one of the plurality of one of the display units is a controllable outdoor sign.

29. The system of claim 25, wherein the point of sale device is connected to the mesh radio network.

30. A system for managing a plurality of signs at a store that sells fuel products, has fuel pumps and outdoor pricing signs, comprising:

a point of sale device at the store;

a controllable outdoor sign receiving a fuel price from the point of sale device and displaying the fuel price; and a communications verification system monitoring a communication between the point of sale device and the controllable outdoor sign and determining if a message sent from the point of sale device was correctly received, logging a status of the message;

a feedback system that determines whether the controllable outdoor sign displays a correct and legible price, where determining that the controllable outdoor sign displays the correct and legible price includes a processor routine that determines whether error conditions in light sources illuminating the controllable outdoor sign have an effect on the legibility of the sign or wherein determining that the controllable outdoor sign displays the correct and legible price includes determining whether a scroll sign numeral indicators are aligned with readers that determine what number is being displayed by the controllable outdoor sign.

31. The system of claim 30, wherein the communications verification system sends an alert if the message was not correctly received.

32. The system of claim 31, further including a headquarters control center, the headquarters control center transmitting a fuel pricing message to the point of sale.

33. The system of claim 32, further including a plurality of display units displaying the fuel price and a mesh radio network connecting the plurality of display units and the point of sale device.

34. A system for managing signs at a store that sells fuel products, has fuel pumps and outdoor pricing signs, comprising:

a pricing system for determining a price for a fuel product;

a store controller located at the store receiving the price for the fuel product;

a controllable outdoor sign receiving the fuel price from the store controller and displaying the fuel price; and a sign feedback system in the controllable outdoor sign that determines if a sign displays a correct and legible price without the use of cameras;

a feedback system that determines whether the controllable outdoor sign displays a correct and legible price, where determining that the controllable outdoor sign displays the correct and legible price includes a processor routine that determines whether error conditions in light sources illuminating the controllable outdoor sign have an effect on the legibility of the sign or wherein determining that the controllable outdoor sign displays the correct and legible price includes determining whether a scroll sign numeral indicators are aligned with readers that determine what number is being displayed by the outdoor sign.

35. The system of claim 34, further including:

a plurality of display units at the store, each of the display units displaying the price for the fuel product; and a mesh radio network providing communication between each of the plurality of display units.

* * * * *